May 16, 1933.  H. H. BECKWITH  1,909,089
SHOEMAKING
Filed Oct. 27, 1931
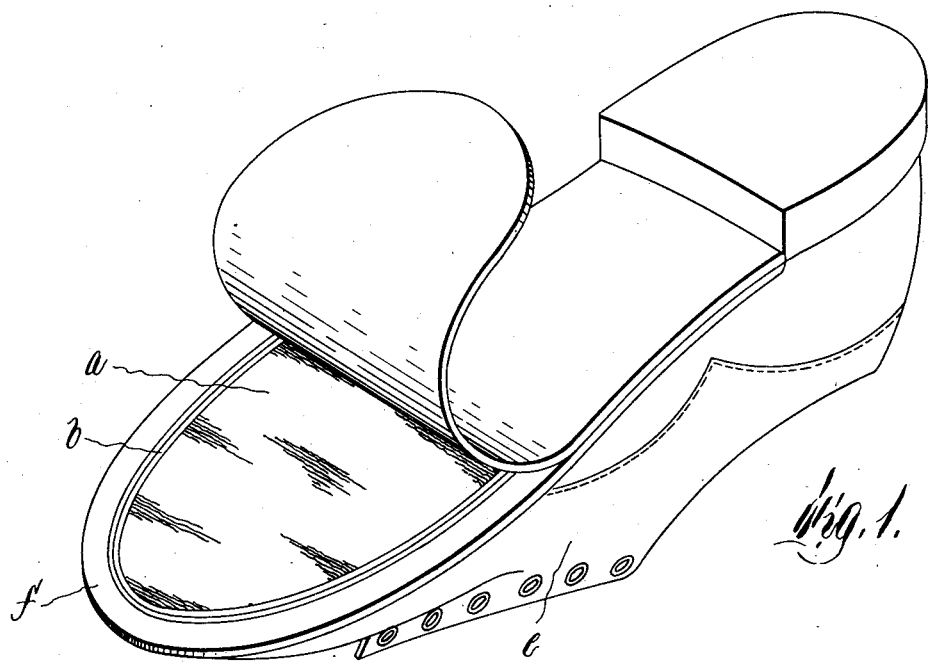
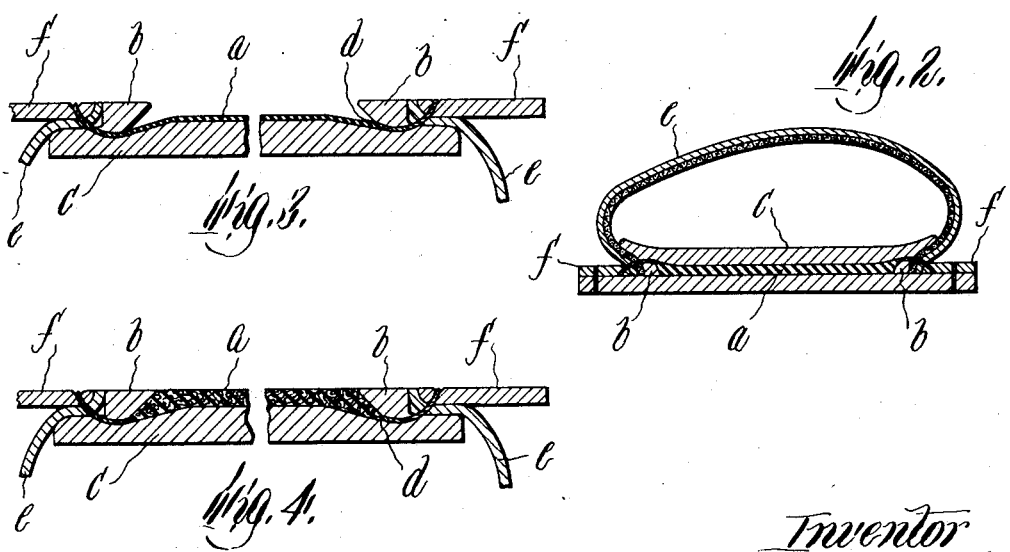
Inventor
Harry H. Beckwith
by Wright, Brown, Quinby & May
Attys.

Patented May 16, 1933

1,909,089

UNITED STATES PATENT OFFICE

HARRY H. BECKWITH, OF BROOKLINE, MASSACHUSETTS, ASSIGNOR TO BECKWITH MANUFACTURING COMPANY, OF BOSTON, MASSACHUSETTS, A CORPORATION OF MASSACHUSETTS

SHOEMAKING

Application filed October 27, 1931. Serial No. 571,297.

This invention relates to shoemaking and more especially that phase of shoe manufacture dealing with the filling of the cavity or hollow occurring between the inner and outer soles, as, for instance, the bottom cavity formed within the stitch-receiving rib of a welt shoe.

In accordance with the present invention, the cavity is filled with sponge rubber produced in any suitable manner, preferably in situ in the cavity. There are various ways of accomplishing this result by the use of suitable rubber compounds in liquid, semi-solid, or solid state. In accordance with one preferred embodiment of the present invention, the cavity is only partially filled with a rubber compound containing a chemical which generates gas upon the application of heat, whereupon the compound is heated in applied position to cause the generation of gas and the distention of the compound so as to fill the cavity. The distended rubber compound is of a spongy or reticulated structure containing gas pockets distributed therethrough and is hence so resilient, flexible, and compressible as to make for extreme comfort, even in the case of brand new shoes. The cushioning action of the distended rubber compound allows the wearer to conform the innersole with the shape of his foot at once, so that the usual discomfort incident to the breaking in of a new pair of shoes is obviated. The rubber compound is further valuable, not only in that it prevents the access of moisture through the innersole area where it is applied, but further in that it seals the stitch holes in the stitch-receiving rib. Again, the rubber compound becomes so firmly bonded to the insole, especially when vulcanized, that there is no tendency for the shoes to squeak. The vulcanization of the rubber compound may be accomplished simultaneously with the application of heat for the purpose of causing a liberation of gas from the gas-generating chemical.

There are various chemicals, such as ammonium carbonate and ammonium sulphide, which decompose readily under the action of heat to liberate one or more gases, and which might hence serve in the rubber compound used in the present invention, but I prefer to use the carbonates, preferably sodium bicarbonate, because the carbon dioxide gas released thereby is odorless and is inert under the decomposing temperatures employed. I prefer to use along with the carbonate an acid or salt which accelerates the decomposition of the carbonate under the application of heat, but which has little, if any, effect thereupon under normal temperature conditions. The rubber compound may be rolled or calendered into a sheet, from which a blank for the shoe cavity can be died out and applied to the shoe bottom; or the rubber compound may be one which lends itself to extrusion, especially under the application of moderate heat, and so can be applied to the shoe bottom in heat-plasticized condition from a bulk supply in an extruding gun, the nozzle of the gun being manually moved by the operator to traverse the entire area of the shoe bottom and to deposit a substantially uniform layer of rubber compound thereover.

There are various rubber compounds which might answer the purposes of the present invention, but I shall give the formulæ of only two, which have been found to be quite satisfactory:

Formula No. 1

| | Parts |
|---|---|
| Rubber (crepe) | 100 |
| Whiting | 50 |
| Zinc oxide | 4 |
| Petrolatum | 5 |
| Sulphur | 3 |
| Accelerator of vulcanization | 2.2 |
| Stearic acid | 4 |
| Sodium bicarbonate | 10 |

These raw materials are compounded as on a roll mill or in an internal rubber-mixer, as in customary practice, whereupon the compounded mass is rolled out as a comparatively thin web having a thickness of, say, about $\frac{1}{32}$ of an inch, from which blanks for application to the shoe bottoms can be died out. The function of the whiting in the compound is merely that of a loading material. In its place, ferric oxide, china clay, talc, or other loading materials might be used. The petrolatum is a softening or plasticizing agent. After the blank of rubber compound has been applied to the shoe bottom, sufficient heat is applied thereto to cause the generation of carbon dioxide, which distends the dense rubber compound into a spongy structure filling the bottom cavity completely. The applied blank may, for example, be brought into contact with an iron form or plate heated to a temperature of about 280° F. At the end of about five minutes, the blank destends to fill the cavity completely, and the rubber is simultaneously vulcanized and becomes tenaciously bonded to the innersole backing. The distention of the blank may be six to twelve, or more, times the thickness of the original blank, depending upon the degree and the duration of the heat applied. The higher the temperature to which the blank is heated, the quicker is the liberation of the carbon dioxide from the sodium bicarbonate, but the temperature chosen should be a moderate one, insufficiently high to cause injury to the shoe.

*Formula No. 2*

| | Parts |
|---|---|
| Rubber (smoked sheet) | 20 |
| Red iron oxide ($Fe_2O_3$) | 5 |
| Zinc oxide | 2 |
| Granulated cork (optional) | 20 |
| Montan wax | 20 |
| Rubber substitute | 20 |
| Rosin residue | 25 |
| Sulphur | 0.8 |
| Accelerator of vulcanization | 0.1 |
| Cream of tartar | 4 |
| Sodium bicarbonate | 1½ |

The ingredients used in this second formula are designed to yield a rubber compound lending itself to application by extrusion. Thus, the large amounts of montan wax and rosin residue impart sufficient softness and plasticity to the mass, especially at moderately elevated temperature, so that it flows under pressure and can hence be dispensed by extrusion from a pressure gun into a shoe bottom. The potassium tartrate, being an acid salt, promotes the liberation of carbon dioxide from sodium bicarbonate.

In preparing the rubber compound, one should preferably select a gas-generating chemical which liberates the gas only at elevated temperature, for it is desirable that the rubber compound be distended in situ in the shoe bottom, and not during its preparation or while it is being kept under normal conditions. So, too, the chemical used to accelerate the liberation of gas may be one operative only at elevated temperature, for instance a temperature at which the rubber can be simultaneously vulcanized. The rubber compound need not, however, necessarily be prepared with a view toward ultimate vulcanization, in which case the gas-generating chemical and the accelerator of gas-liberation may conduce to the desired results with the application of comparatively little heat. Yet the degree of heat necessary should be considerably beyond the temperature which the shoe reaches on the wearer's foot or when exposed to extreme climatic conditions, as it is undesirable that the compound distend beyond the complete filling of the shoe cavity, as might be the case should residual active chemicals be left in the compoound even after the shoe cavity has been completely filled. When carbonates are used, and more especially sodium bicarbonate, there is no trouble in imparting to the rubber compound a decomposibility of its carbonate content at only the proper elevated temperature, especially when an accelerator of decomposition like stearic acid or cream of tartar is employed conjunctively with the carbonate. Of course, other suitable accelerators of decomposition, such as oleic, palmitic, tartaric, and citric acids might be used.

On the accompanying drawing,

Figure 1 shows in perspective a completed welt shoe with its outer sole in raised position to show the underlying bottom filler compound.

Figure 2 represents a transverse section through the toe portion of the shoe.

Figure 3 illustrates a section through the inner sole of the shoe immediately after the rubber compound has been placed in the cavity, the other shoe parts being largely broken away in the interests of clarity.

Figure 4 is a view similar to Figure 3 but showing the rubber compound in distended, spongy condition and completely filling the cavity.

As best shown in Figure 3 of the drawing, the rubber compound is applied as a thin layer $a$ in the cavity formed within the stitch-receiving rib $b$ of the insole $c$. The layer $a$ may be a pre-formed blank of the rubber compound, or one laid in situ as hereinbefore described. In any event, the layer is caused to adhere to the insole backing by its inherent tackiness. The layer may be rolled out, if desired, to present a smooth surface, especially one deposited by extrusion from a suitable dispensing device. Heat is suitably applied to the layer to cause it to distend until it substantially completely fills the cavity as shown in Figure 4, whereupon the application of heat is stopped, so that no further distention can ensue. The compound spreads into the corner $d$ formed by the rib $b$ and fold of the insole $c$ so as to seal the stitch holes formed in the rib as a result of stitching the shoe upper $e$ and the welt $f$ thereto. The outer sole $g$ may be sewed to the welt $f$ to lie smoothly against the filled bottom and the remaining shoemaking operations performed.

It will, of course, be appreciated by those skilled in the art that other rubber compounds made up of suitable ingredients and proportioned in amounts other than those given in the foregoing specific formulæ may be prepared and applied in accordance with my invention. Thus, one might have recourse to rubber cements or solutions in rubber solvents like benzol, or to aqueous rubber dispersions of the nature of latex (either unvulcanized or prevulcanized) or artificially prepared from crude or reclaimed rubber. Such rubber compositions may be used at a spreadable or liquid consistency, together with suitable frothing or foaming agents, which when added to or whipped into the composition conduce to the generation and/or entrapment of gas bubbles in the composition, wherefore, when the composition is introduced into a shoe cavity and is caused to dry or set therein, the resulting set rubber compound is characterized by a spongy or honeycomb structure. For example, saponaceous substances like soaps may be whipped into rubber latex compositions or the like intended for the filling of shoe cavities. Or the liquid rubber compositions may be charged with carbon dioxide or other suitable gases, which charging may be carried out under superatmospheric pressure. In such latter instances, no heat need be applied in preparing the desired rubber composition; and the rubber composition containing the gas bubbles distributed therethrough may be spread into the shoe cavity to fill the same at normal temperature conditions, whereupon the composition may be allowed to dry or set in situ at normal temperatures or with the application of heat to produce the desired solid, sponge-rubber structure. The rubber will be vulcanized when a pre-vulcanized latex is used; or the latex may have added thereto a suitable amount of sulphur, accelerators of vulcanization, or the like, so that when dried and set under the application of heat, it undergoes vulcanization. The rubber composition may, if desired, also contain granulated cork or other bulky materials customarily used in filling shoe bottoms.

I claim:

1. In the manufacture of shoes having cavities between their inner and outer soles, those steps which comprise only partially filling the cavity with a rubber compound, and then causing said rubber to distend into a spongy structure completely filling said cavity.

2. In the manufacture of shoes having cavities between their inner and outer soles, those steps which comprise depositing in said cavity as a layer only partially filling the same, a rubber compound containing a chemical capable of generating gas, and then causing a generation of gas from said chemical to distend said rubber compound into a spongy structure completely filling said cavity.

3. In the manufacture of shoes having cavities between their inner and outer soles, those steps which comprise depositing in said cavity as a layer only partially filling the same, a rubber compound containing a chemical capable of generating gas under the application of heat, and then heating said layer in situ to generate gas from said chemical and thereby to distend said rubber compound into a spongy structure completely filling said cavity.

4. In the manufacture of shoes having cavities between their inner and outer soles, those steps which comprise depositing in said cavity as a layer only partially filling the same, a heat-vulcanizable rubber compound containing sodium bicarbonate and a chemical which promotes liberation of carbon dioxide from said bicarbonate under the application of heat, and then heating said layer in situ to cause vulcanization and to liberate carbon dioxide from said bicarbonate and thereby to distend said rubber compound into a spongy, vulcanized structure completely filling said cavity.

5. In the manufacture of shoes having cavities between their inner and outer soles, those steps which comprise placing a spreadable rubber compound in the cavity next to said innersole, and then causing the rubber compound to become distended and set as a spongy structure in the cavity.

6. In the manufacture of shoes having cavities between their inner and outer soles, those steps which comprise placing in the cavity next to said innersole a spreadable rubber compound containing a chemical capable of generating gas under the application of heat, and then heating the rubber compound to cause generation of gas from said chemical and thereby to distend said rubber compound to a spongy condition in the cavity.

7. In the manufacture of shoes having cavities between their inner and outer soles, those steps which comprise placing in the cavity next to said innersole a spreadable, heat-vulcanized rubber compound containing a chemical capable of generating gas under the application of heat, and then heating the rubber compound to cause generation of gas from said chemical and thereby to distend said rubber compound to a spongy, vulcanized condition in the cavity.

In testimony whereof I have affixed my signature.

HARRY H. BECKWITH.